United States Patent [19]

Sanchez et al.

[11] 4,350,014

[45] Sep. 21, 1982

[54] PLATFORM FOR UTILIZATION OF THE THERMAL ENERGY OF THE SEA

[75] Inventors: Pierre Sanchez, Cesson; André Vitalis, Paris, both of France

[73] Assignee: Societe Anonyme dite: Sea Tank Co., Rungis, France

[21] Appl. No.: 97,285

[22] Filed: Nov. 26, 1979

[30] Foreign Application Priority Data

Nov. 30, 1978 [FR] France .................................. 78 33888
Jan. 25, 1979 [FR] France .................................. 79 01971
Oct. 8, 1979 [FR] France .................................. 79 24975

[51] Int. Cl.$^3$ ............................................. F03G 7/04
[52] U.S. Cl. .................................. 60/641.7; 114/264; 405/195
[58] Field of Search .................... 60/641.7, DIG. 10; 114/264, 265; 405/198, 204, 224, 200, 195

[56] References Cited

U.S. PATENT DOCUMENTS 3,805,515 4/1974 Zener .................................. 60/641.7
4,014,279 3/1977 Pearson ........................... 60/641.7 X
4,231,312 11/1980 Person ................................ 114/264

FOREIGN PATENT DOCUMENTS 2356039 7/1976 France .

Primary Examiner—Allen M. Ostrager
Assistant Examiner—Stephen F. Husar
Attorney, Agent, or Firm—Sughrue, Mion, Zinn, Macpeak & Seas

[57] ABSTRACT

The invention relates to a platform for utilization of the thermal energy of the sea, comprising a floating structure carrying a downwardly extending tube (2) for taking up cold water and supporting at least two power modules (3) each comprising an evaporator (15) and a condensor (12) and pumps for circulation of hot and cold water, each power module being connected to a turbine-driven generator set (19,19').

According to the invention, the support structure has open cells receiving the power modules and each module has its component parts arranged in a vertical array so as to constitute a cylindrical assembly extending through the support structure.

Preferred applications: offshore manufacture of aluminium, ammonia and hydrogen.

40 Claims, 16 Drawing Figures

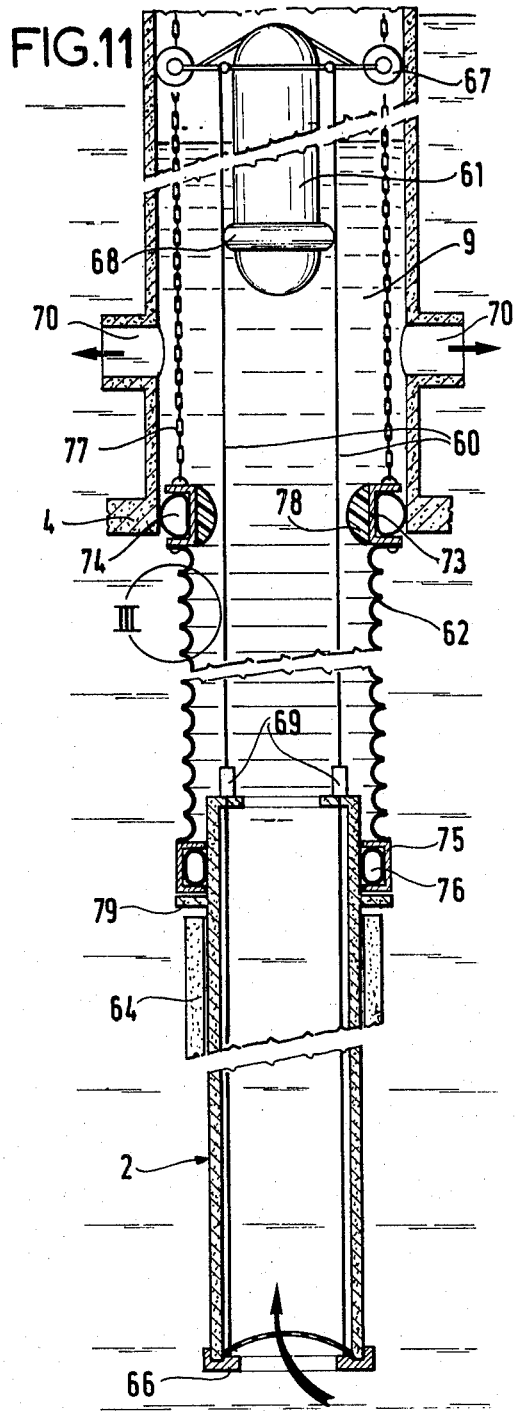
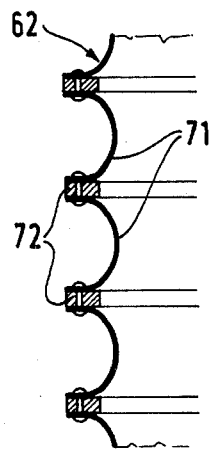
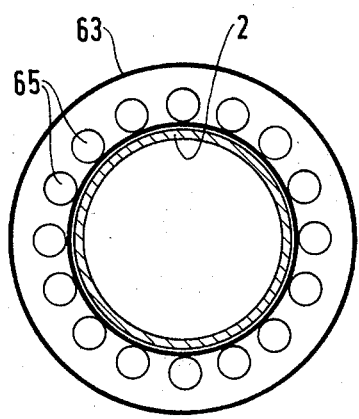

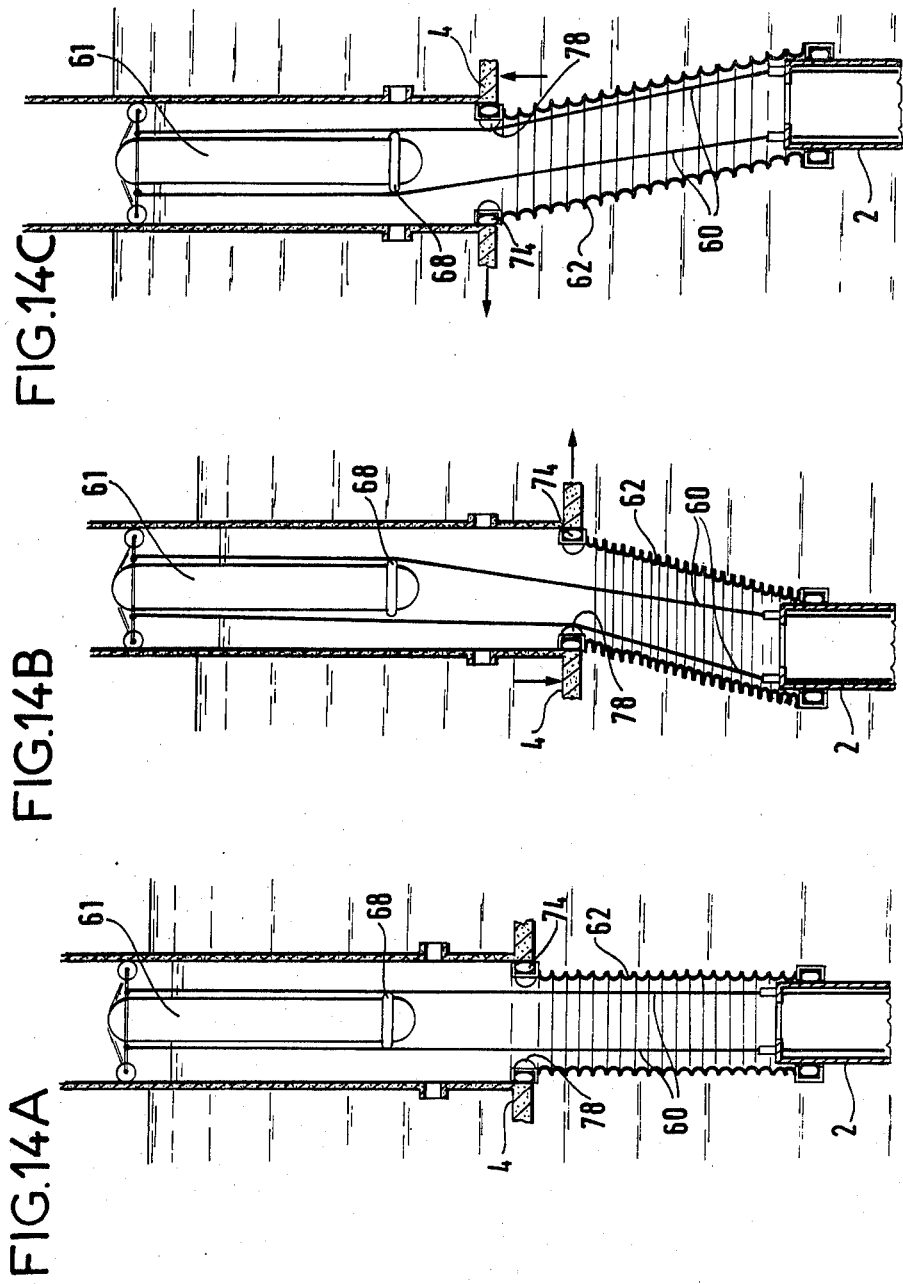

PLATFORM FOR UTILIZATION OF THE THERMAL ENERGY OF THE SEA

FIELD OF THE INVENTION

The present invention concerns platforms for utilisation of the thermal energy of the sea, especially those of the type comprising a floating structure carrying a downwardly extending tube for taking up cold water and supporting at least two power modules each comprising an evaporator and a condenser and pumps for circulation of hot and cold water, each power module being connected to a turbine-driven generator set.

BACKGROUND OF THE INVENTION

All known projects currently at the design or implementation stage have their technical basis in the principle put forward by the physicist Arsène d'Arsonval and in turn based on Carnot's principle. This concerns the operation of a thermodynamic machine using water taken from the surface of the sea as the "hot" source and water from the depths of the ocean, which is continuously protected from the action of the sun, as the "cold" source.

The principal known floating devices designed for conversion of the thermal energy of the sea into usable kinetic energy fall into a number of groups, depending on the type of floating support structure used:

boats or barges with a substantially rectangular flotation area, circular floats in the general shape of a biscuit, whose flotation area is a large circle, spherical floats, submersible cylindrical floats, vertical column type floats, and semi-submersible structures.

Experience has shown that the semi-submersible structure type of support offers numerous advantages, in particular in that it is more resistant to the action of the ocean swell than a floating structure having a large flotation area.

Two interesting projects already propose the use of this type of structure.

A first proposal is a semi-submersible offshore station of the Froude pole type. A cylindrical concrete structure carries a downwardly extending tube, also of concrete, for taking up cold water. This structure supports four identical modules arranged around its perimeter, each module comprising an evaporator and a condenser separated by an axial-flow turbine-driven generator set. The modules are removable and may be replaced in their entirety for repair and maintenance. Although of great interest, this project has a number of disadvantages:

it features no self-contained means for manipulating and replacing the modules, the modules must be connected up under water, calling for the use of divers, the procedures for avoiding pollution of the gas circuits by sea water during replacement of modules are complex, the fluid circuits are complex, the turbine-driven generator set uses a submerged motor, of doubtful reliability and preventing in-operation maintenance, the heat exchangers (condenser and evaporator) are of a highly sophisticated design, the modules are vulnerable in that they are disposed around the perimeter, and therefore susceptible to damage by impact with floating bodies, the stability of the platform is compromised in the event of entry of water into any of the peripheral compartments, equilibrium of the structure is lost when any module is removed.

This structure uses a closed circuit for its cryogenic fluid, which is ammonia. Water is circulated through the inside of the heat exchanger tubes and the ammonia over the outside.

The second proposal is a platform whose support structure is of concrete, but in this instance the platform is of circular shape, comprising four groups of evaporators, turbine-driven generators and condensers. These groups are not designed as interchangeable modules as in the previously described project, but are integrated into the shell of the structure in four respective machine rooms. This platform also uses a closed ammonia circuit.

Apart from the fact that this type of platform is subject to high levels of movement under the effect of the ocean swell, this project has further disadvantages:

the condensers and evaporators are of a highly sophisticated design, the cryogenic gas and water circulation circuits are numerous and complex, the dismantling and replacement of component parts of the integrated groups is complicated by virtue of the large number of circuits and their connections to the components in question, stability may be lost in the event of damage to any compartment, leading to the entry of water.

Other known projects differ in terms of the type of floating support structure and the arrangement of the component parts of the power groups. They also suffer from the aforementioned disadvantages, to a greater or lesser extent.

The present invention is intended to provide a platform offering a higher level of performance, reducing or eliminating the stated disadvantages of the prior art platforms while being of simple design and offering moderate manufacturing and maintenance costs.

SUMMARY OF THE INVENTION

The present invention consists in a platform for utilisation of the thermal energy of the sea, comprising a floating structure carrying a downwardly extending tube for taking up cold water and supporting at least two power modules each comprising an evaporator and a condenser and pumps for circulation of hot and cold water, each power module being connected to a turbine-driven generator set. The invention is characterised in that the support structure has open cells receiving the power modules and that each module has its component parts arranged in a vertical array so as to constitute a cylindrical assembly extending through the support structure.

A platform in accordance with the invention may further comprise one or more of the following features:

the support structure is semi-submersible and comprises a cellular concrete base surmounted by columns supporting a working deck, each module passing through said base and said working deck;

each module is integrated into a moving tower so as to constitute a cartridge which can be moved vertically by lifting equipment carried by the support structure, the moving tower comprising support means adapted to bear on the support structure, so as to complement said lifting equipment when in service;

the rotors of the hot and cold water circulating pumps in each module are driven by a common and substantially vertical shaft;

each module comprises a circuit for the passage of a cryogenic fluid passing through the turbine of the associated turbine-driven generator set; the portion of the circuit carrying the expanded gas towards the condenser preferably comprises a conduit which is inside and coaxial with the pump rotor drive shaft;

the portion of the circuit carrying the compressed gas towards the turbine of the associated turbine-driven generator set comprises a separator consisting of an annular space whose outside surface directed towards its axis forms a venturi for the hot water circulation pump rotor;

an oblique deflector is attached to the moving tower between the lower part of the evaporator and the cold water circulation pump rotor, so that hot water having passed through the evaporator is taken off through the open bottom of a cell adjacent the cellular base of the support structure, and that cold water from the downwardly extending tube is directed towards the rotor of the associated pump and then to the upper part of the condenser;

the condenser and the evaporator of each module are coaxial with the common rotor drive shaft of the hot and cold water circulation pumps; the tubes of the condenser and the evaporator are preferably engaged at their ends in circular headplates and are so arranged as to provide a central circular passage for the rotor drive shaft of the pumps and/or the conduit carrying the low-pressure cryogenic fluid;

the downwardly extending tube taking up cold water discharges into a central cell of the cellular base of the structure, said cell communicating with the cells of said base receiving said modules; the downwardly extending tube is preferably attached to the cellular base by means of a flexible coupling allowing a certain degree of relative movement between said tube and the support structure; the central cell is closed off at the top by means of a watertight cover which is auto-buoyant and submersible, and a moving door is provided to selectively shut off communication between the central cell and the cells receiving said modules.

The invention also concerns the connection between the downwardly extending tube and the support structure.

A first embodiment of the invention, consisting in a platform of the aforementioned type, is characterised in that the downwardly extending tube is attached to the support structure by means of an articulated coupling providing a certain degree of relative movement between said tube and said structure.

The aforementioned first embodiment of a platform in accordance with the invention may further comprise one or more of the following features:

the support structure is semi-submersible and comprises a cellular concrete base surmounted by columns supporting a working deck, each module passing through said base and said working deck, and the downwardly extending tube discharges into a central cell of said base communicating with the cells receiving said power modules, the articulated coupling being at the level of the bottom of the central cell which is closed off at the top by a watertight cover;

the upper end of the downwardly extending tube, of positive apparent weight, is suspended by cables connected to the support structure through a swell compensating system, and passes through a sleeve carrying an external collar defining, with the base of said structure, a ball joint, inflatable seals being provided between said upper end of said tube and the internal surface facing said sleeve; the part of the ball joint co-operating with the collar of the sleeve preferably comprises a ballasted toroid suspended from the watertight cover on cables; the cables supporting the top of the downwardly extending tube pass through the watertight cover and are connected to the working deck, and the top of the sleeve terminates in a collar whose external diameter is greater than the smallest internal diameter of the suspended ballasted toroid; the space between the sleeve and the facing end of the downwardly extending tube may be filled with water under pressure; the water is preferably pressurized by cold water from the central cell, after passing through the cold water circulation pump of at least one power module and discharging peripherally into the collar of the sleeve and then the sleeve itself; the internal surface of the sleeve has a peripheral cellular region, each cell being fed with cold water under pressure;

alternatively, the upper portion of the downwardly extending tube slides in an annular sheath attached to the lower portion of the structure, the intermediate space being filled with water under pressure; the water is preferably pressurized by cold water from the central cell, after passing through the cold water circulation pump of at least one power module and discharging peripherally into the annular sheath; the internal surface of the annular sheath is formed with a plurality of cells, each of which is fed with cold water under pressure; the upper end of the downwardly extending tube is suspended from the support structure by a swell compensating system; the downwardly extending tube, if of negative apparent weight, has its lower end attached to the seabed;

the downwardly extending tube is fitted with inflatable flotation chambers which complement the articulated coupling to the support structure.

In a second embodiment of the connection between the downwardly extending tube and the support structure, the platform is characterised in that the downwardly extending tube is attached to the support structure by self-contained means decoupling the movement of said platform from that of said tube, whatever the directions of said movements.

The aforementioned second embodiment of a platform in accordance with the invention may further comprise one or more of the following features:

the support structure is semi-submersible and comprises a cellular concrete base surmounted by columns supporting a working deck, each module passing through said base and said working deck, and the tube discharges into a central cell of said base communicating with the cells receiving power modules, and the central cell is a cylindrical chamber aligned with the vertical axis of the platform, the lower portion of said chamber passing through the apron of the structure, whereas the upper portion is in open communication with the atmosphere, the self-contained support means for said downwardly extending tube comprising suspension cables connecting said tube to at least one flotation unit disposed in the cylindrical chamber, a seal being provided between said chamber and said tube;

the flotation unit is provided with means for guiding it in its vertical movement within the cylindrical chamber, and with external protection members which prevent the suspension cables rubbing against it;

the seal comprises a flexible sleeve connecting the lower portion of the cylindrical chamber to the upper portion of the downwardly extending tube; the flexible sleeve is longitudinally extensible, and comprises a series of flexible half-toroids attached to rigid rings;

the connection between the flexible sleeve and the lower portion of the cylindrical chamber and the connection between said sleeve and the upper portion of the downwardly extending tube are provied by inflatable members which also provide a sealing action at each of said connections; the flexible sleeve terminates at its upper end in a collar around the outside of which is arranged an annular inflatable seal; the collar is directly or indirectly suspended from the working deck; the collar has at its inside peripheral edge external protection members which prevent the suspension cables for the downwardly extending tube rubbing against the collar;

the downwardly extending tube is of positive apparent weight and fitted with inflatable flotation chambers which complement the tube suspension cables; each inflatable chamber preferably contains cylinders of compressed gas, which can be opened by remote control, by means of an acoustic device, for example; the downwardly extending tube carries cable jacks associated with the tube suspension cables, said cables being attached to the lower end of the tube so as to pretension said cables;

the external diameters of the component parts of the connection between the downwardly extending tube and the support structure are all less than the internal diameter of the cylindrical chamber.

Other features and advantages of the invention will emerge more clearly from the following description of the invention which is given by way of non-limiting example only and with reference to the accompanying drawings.

BRIEF DESCRIPTION OF THE DRAWINGS

FIG. 11 is a vertical sectional view which shows the connection shown in FIG. 10 in more detail;

FIG. 12 shows detail XII from FIG. 11 to a larger scale;

FIG. 13 is a horizontal cross-section along lines XIII—XIII in FIG. 10, showing an inflatable bladder containing cylinders of compressed gas; and FIGS. 14A, 14B and 14C are vertical schematic representations of various relative positions of the downwardly extending tube and platform, illustrating the operation of the flexible and extensible connecting sleeve.

DESCRIPTION OF PREFERRED EMBODIMENTS

Figure 1:
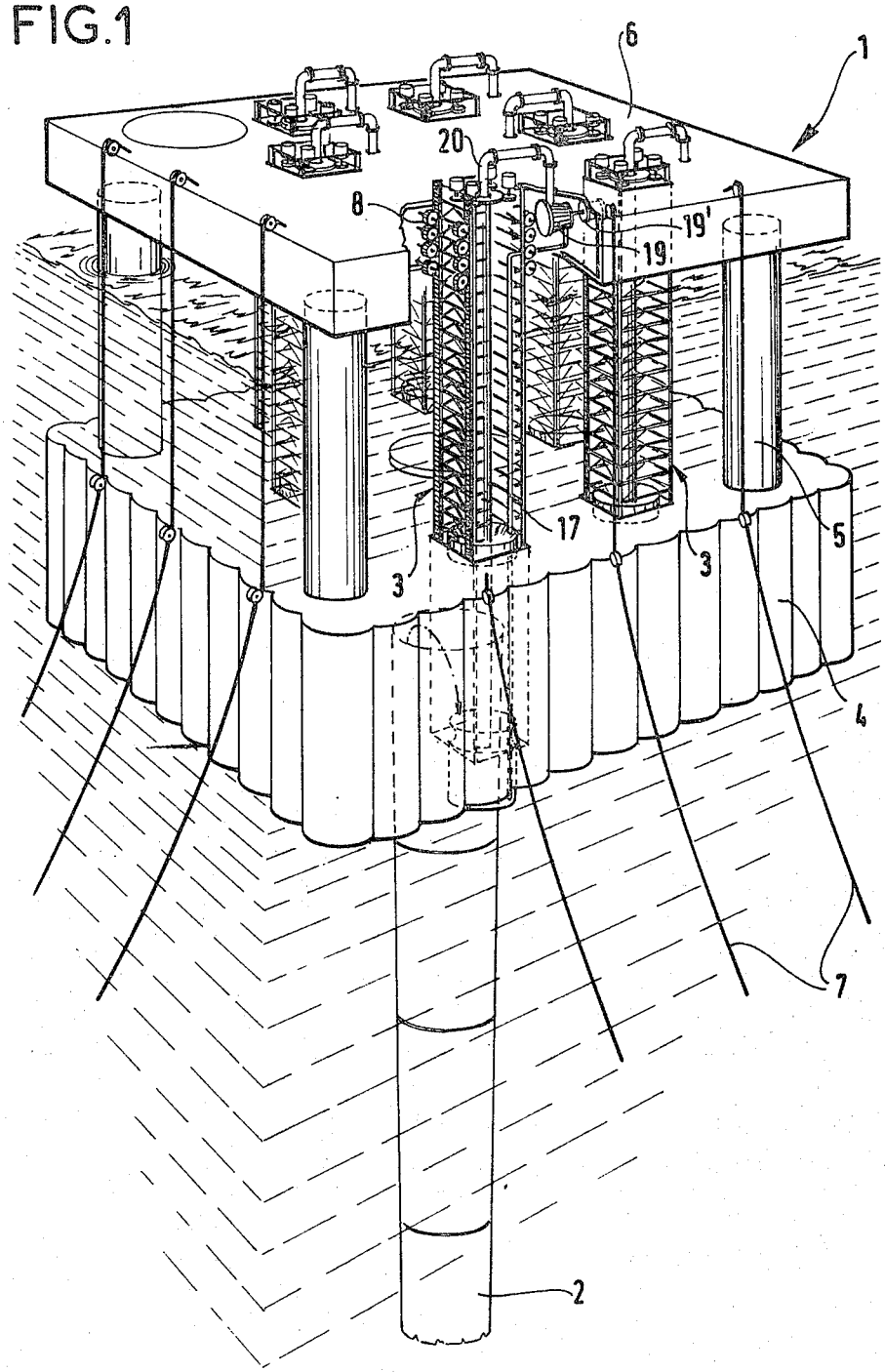
FIG. 1 is a perspective view of a platform in accordance with the invention, incorporating six modules.

FIG. 1 is a general view of the platform in accordance with the invention. The platform comprises a floating structure 1 carrying a downwardly extending tube 2 for taking up cold water and supporting at least two (in this instance, six) power modules 3, the design of which will be described in detail below. In accordance with the invention, the support structure 1 has open cells receiving the power modules, each module 3 having its component parts arranged in a vertical array so as to constitute a vertical cylindrical assembly extending through the support structure. The support structure 1 is preferably semi-submersible and comprises a cellular concrete base 4 surmounted by columns 5 (preferably of concrete) supporting a working deck 6 above the surface of the water. Each module 3 passes through said base and said working deck. As compared with conventional steel structures, the use of concrete confers invulnerability to corrosion, eliminating all necessity for caring and maintenance.

The structure 1 is located where the depth of the water exceeds 600 meters and for preference in tropical regions where the temperature differential habitually reaches 20° C. It may be anchored by means of anchor lines 7 (as shown), or alternatively, it may be positioned dynamically by means of a remotely controlled system of nozzles utilising the residual power of the circulating water at the exchanger outlets.

As will be described fully below, the platform in accordance with the invention is distinguished from existing structures by the design and arrangement of the means used to convert the thermal potential energy of the sea to kinetic energy. This conversion may be carried out in a closed cycle, using a cryogenic fluid chosen on the basis of the temperatures of the available hot and cold sources. This type of system will be described in detail herein, as in such a system the invention provides significant advantages. Nevertheless, it will be apparent that those skilled in the art will be able to adapt this principle without difficulty to an open cycle system based on the conventional use of the known properties of water vapour.

The type of structure chosen for preference resembles the platforms used on offshore oil fields, and offers a number of advantages. In particular, since it is semi-submersible it will have excellent resistance to the effects of ocean swell and its stability will be fully controllable by ballasting one or more carefully selected cells within the cellular base. Moreover, the cellular design of the base is particularly well suited to a modular approach to the design of the energy conversion installation and facilitates the installation of the various modules.

As can be seen from FIG. 1, each module 3 can be integrated into a steel tower, preferably square in cross-section, so as to constitute a cartridge which can be moved vertically by lifting equipment carried by the support structure, said tower passing through an open cell in the cellular base of said structure. The aforementioned lifting equipment may comprise jacks, racks, winches and cables or any equivalent device. The figure shows toothed wheels 8 supported on the working deck 6 and engaging racks formed along the edges of the steel tower. This arrangement considerably facilitates erection and maintenance of the installation, the hoisting of any one module having no effect on the overall stability of the platform.

Figure 2:
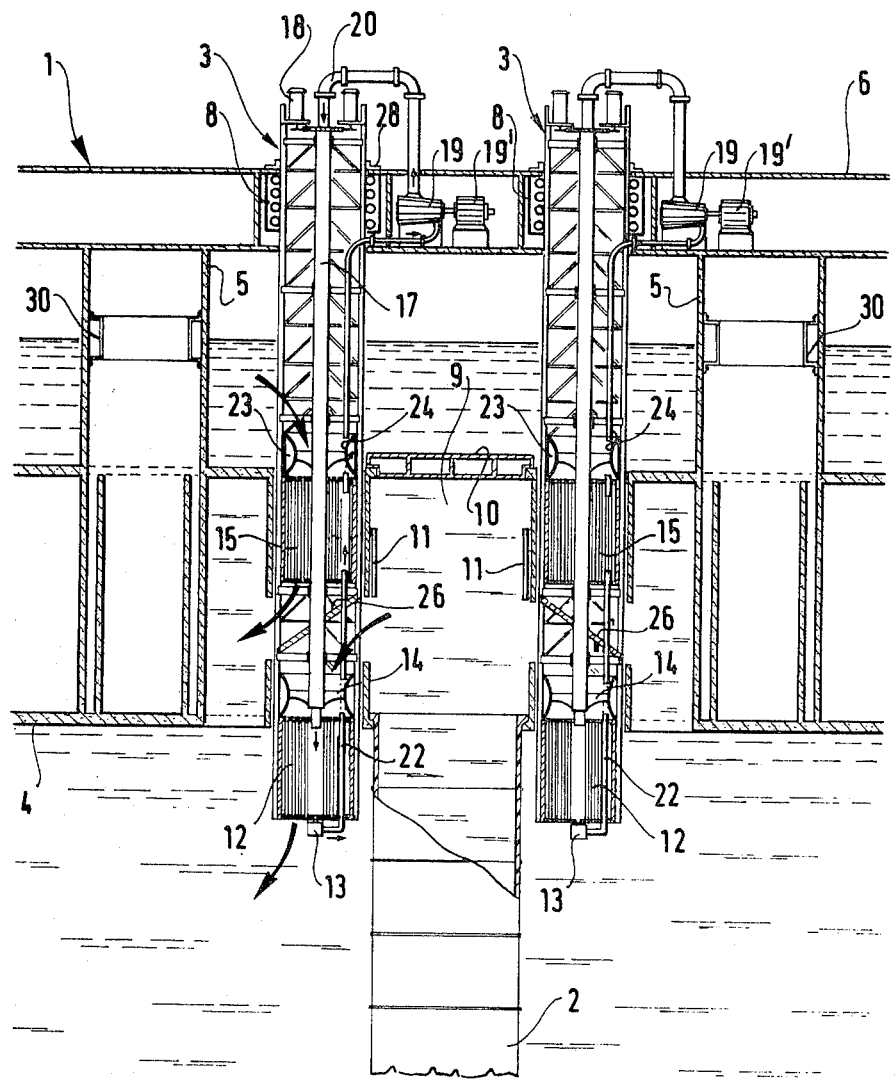
FIG. 2 is a vertical cross-section through the platform shown in FIG. 1, the section plane containing the axes of two modules.
Figure 3:
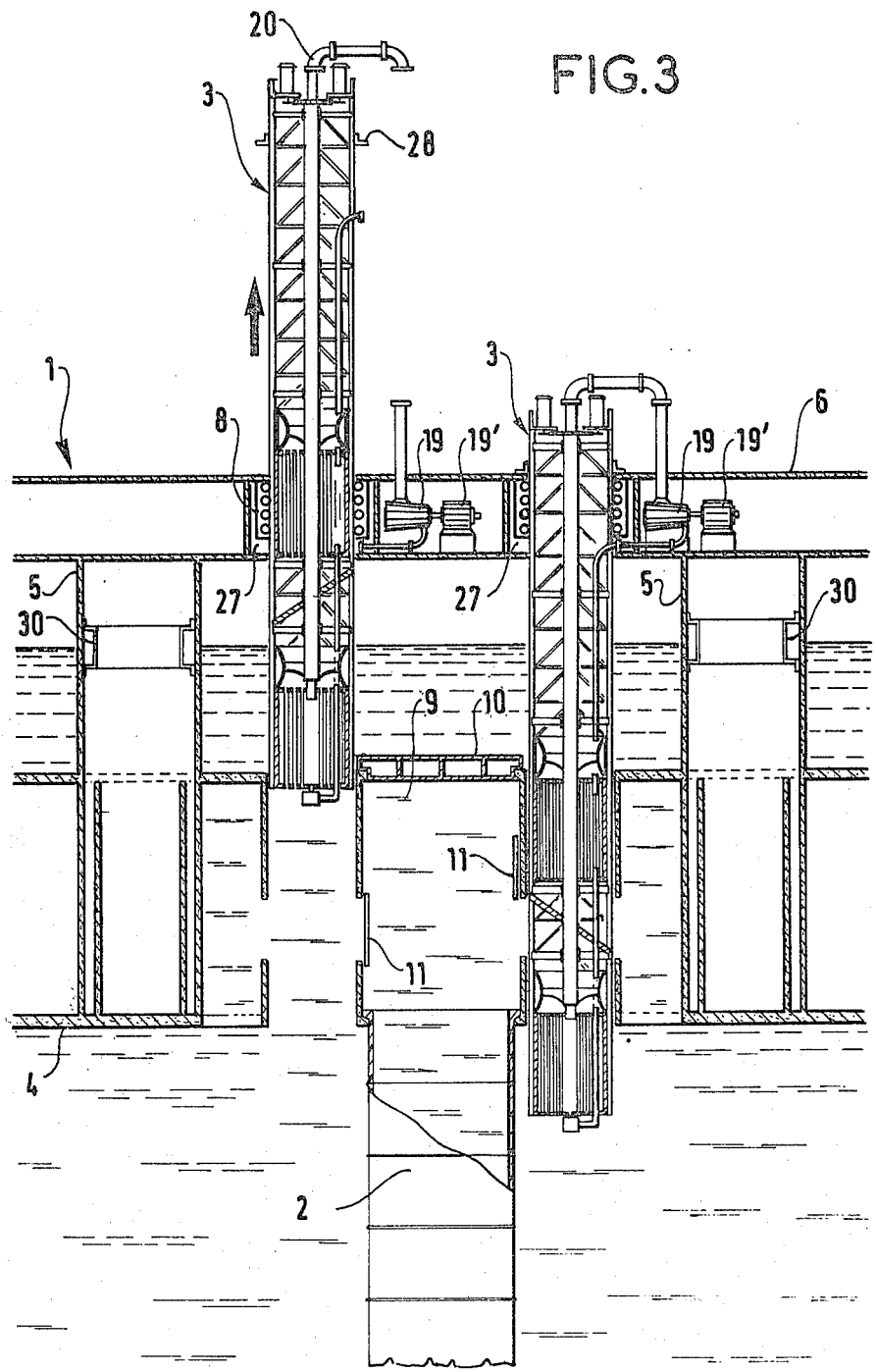
FIG. 3 is a cross-section similar to that of FIG. 2, showing the integration of the modules into vertically movable towers.

As shown in FIGS. 2 and 3, the cellular base 4 comprises a wide circular central well 9 for taking up cold water. This central well 9 provides a chamber for distribution of cold water to the cells receiving modules. Its upper end is closed off after insertion of the cold water aspiration conduit 2 by means of a watertight cover 10, which is preferably of the ballastable caisson type and therefore auto-buoyant and submersible. The cells receiving the power modules 3 comprise neither apron nor roof, so as to permit unrestricted vertical movement of said steel towers.

The hollow columns 5 supporting the deck 6 may be of steel or concrete and are fitted out so as to house the immersion and ballasting system, ancillary systems such as fire pumps and service pumps (cooling, washing water, drinking water, etc), storage facilities for variable loads such as fresh water, fuels, oil cryogenic liquid, and so on. The columns are preferably fitted with a double bulk-head assembly 30 at the normal level of the water surface, improving the stability of the structure in the event of an impact and preventing complete flooding of any column.

The cold water aspiration conduit 2 is flexible and preferably fabricated from reinforced synthetic material, comprising cylindrical components whose axial length is subsantially equal to the radius, stiffened by hoops which are preferably fabricated from glassfibre-reinforced plastics material and connected to one another by woven lanyards of a nylon-type synthetic material.

The conduit 2 is connected to the lower portion of the central cell 9 by means of a flexible coupling providing isolation of said conduit from the movement of the platform produced by the action of the ocean swell, so preventing the generation of potentially dangerous stresses at the platform/conduit interface.

Figure 4:
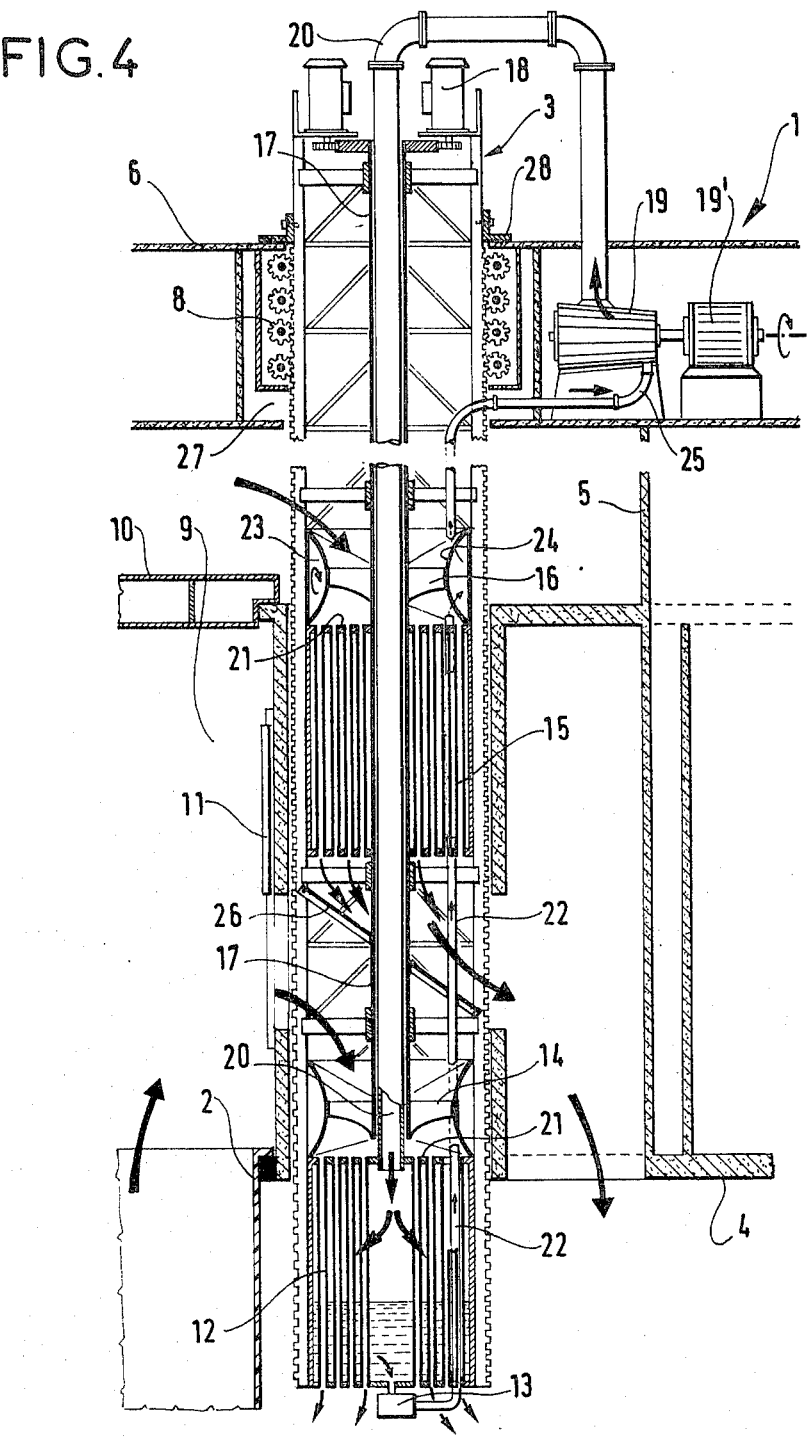
FIG. 4 is a vertical cross-section through a module to a larger scale.

The power modules will now be described with reference to FIG. 4, on which one such module is shown to a larger scale.

As has already been mentioned, the component parts of each module are arranged in a vertical array. The particular embodiment shown in FIG. 4 is of particular advantage, but is shown by way of non-limiting example only.

Each module 3 comprises, starting at the bottom and extending along the same substantially vertical axis:
a condenser 12 and associated cryogenic liquid pump 13,
the rotor 14 of a cold water circulation pump,
an evaporator 15,
the rotor 16 of a hot water circulation pump,
a hollow drive shaft 17 for the rotors of the hot and cold water circulation pumps,
the drive system 18 for the hollow shaft 17.

Each module comprises a cryogenic fluid circuit extending through the turbine 19 driving the generator 19' of the associated turbine-driven generator set, which is housed inside the working deck 6 for protection purposes. This cryogenic fluid may be ammonia or a freon gas mixture or any other gas or fluid whose thermodynamic properties are best suited to the temperatures of the hot source (sea water taken from near the surface) and the cold source (sea water taken from greater depths).

The expanded (low-pressure) gas is conducted from the outlet of the turbine 19 to the condenser 12 by a conduit 20 of large cross-section, the principal vertical section of which is coaxial with and inside the hollow rotor drive shaft 17 of the water circulation pumps. The condenser 12 comprises a bundle of vertically arranged tubes attached in fluid-tight manner to headplates 21 retained by a cylindrical outer collar which, with the headplates, forms a fluid-tight cylinder. The cryogenic gas circulates over the outside of the tubes and condenses in the lower portion of the condenser 12 as it is cooled by the cold water pumped through the tubes by the lower pump rotor 14 driven by the hollow shaft, taking up sea water from the cold water chamber 9 at the centre of the caisson and fed by the cold water aspiration conduit 2. The circulating water is discharged from the lower portion of the caisson. The condensed gas is pumped along a conduit 22 of small cross-section toward the evaporator 15 by a pump 13. The evaporator 15 is of identical design to the condenser 12 already described. The cryogenic liquid evaporates inside the tubes of the evaporator 15 as it is heated by the hot water pumped through the tubes by the upper pump rotor 16 which draws up hot water from the surface of the sea, this water being discharged from the lower portion of the caisson after heat exchange via the evaporator 15. Since it is heated at constant volume, the pressure of the gas increases.

It is preferable to provide at this level a separator 23 which is designed to prevent the entrainment of liquid, said separator preferably comprising an annular space whose outside surface 24 directed towards its axis forms a venturi for the hot water circulation pump rotor 16. The high-pressure gas is then conducted along a conduit 25, which is of the same type as conduit 22, to the high-pressure stage of the turbine 19 in which it is expanded, its energy being recovered by the generator 19'.

An oblique deflector 26 is attached to the moving tower between the lower part of the evaporator 15 and the cold water circulation pump rotor 14, so that hot water having passed through the evaporator 15 is taken off through the open bottom of an adjacent cell, and so that the cold water from the downwardly extending tube 2 is directed towards the rotor 14 of the associated pump and then to the upper part of the condenser 12. It may be advantageous to provide a moving door 11 to selectively shut off communication between the central cell and the cells receiving power modules, to prevent entry of hot water into the cold water inlet when a module is raised.

FIG. 3 shows a module in the raised position. Easy access for installation and maintenance is achieved through a room 27 (more readily visible in FIG. 4) provided within the working deck and surrounding the passage for the module support tower. Access to this room may be facilitated by placing the lifting equipment on top of rather than inside the working deck. Note the support means 28 which complement the lifting system by supporting the mobile tower in the normal operating position.

For starting purposes, a generator set with a power rating one half that of a power module is installed on the working deck to drive the ancillary systems of the associated module (pump rotor drive shaft, circulation pumps, oil pumps, etc). Once the pumps are in operation, the thermodynamic circuit for the cryogenic gas is established and the turbine is driven by the expansion of the gas from the high pressure to the low pressure. Once the first module is operating, further modules may be started up using the power generated by the first module.

By way of example, a platform in accordance with the invention having a net power rating of 100 MW would comprise six power modules. Each module would comprise a condenser fabricated from 34,000 tubes 4 cm in diameter and 15 m long, preferably fabricated from a lightweight material and treated internally to resist corrosion by sea water. The flowrate of cold water at approximately 5° C. through these tubes would be 83.5 m$^3$/s. Hot water at approximately 25° C. would be circulated through an evaporator of identical design to the condenser.

The following advantages are worthy of mention, being additional to those already mentioned in the description of the platform:

ease of erection by virtue of the modular design reducing unit equipment weights, modules can be inspected and serviced in rotation, the other modules remaining in service, mechanical components can be inspected and replaced in a specialised workshop located in or on the working deck, the power module being readily accessible in the raised position, the installation can be started up using an auxiliary generator set of relatively low power rating, since once a first power module has been started up it provides the power required to start up the other modules in succession, the platform can be constructed in shallow water.

The interface between the downwardly extending tube and the support structure will now be considered in more detail, being of primary importance in that unavoidable movements of said support structure, due in particular to the ocean swell, would generate such high stresses at a rigid coupling that such an arrangement is out of the question.

Movement of the support structure in response to the ocean swell, winds and current is the resultant of three principal components, namely drift, surge and heave. Drift is occasioned by the static resultant load produced by the swell, wind and currents, and varies with sea conditions, the design of the support structure and the manner in which the support structure is anchored to the sea bed. On occasion, the drift may be as much as 100 meters. Surge is the result of movement produced by the orbital energy of the water particles, and is a cyclic movement around an equilibrium position imposed by drift, being a function of the swell and the dimensions of the structure. The amplitude of surge movement is limited to a few meters. Heave is of the same order of magnitude as surge, and is caused by the ocean swell. Its magnitude depends on the waveform and amplitude of the swell and on the dimensions of the structure.

A dynamic analysis of the connection of the downwardly extending tube to the floating structure clearly demonstrates the size of the problem to be overcome in eliminating excessive stresses on said tube (shear, tension and torsion).

In the first embodiment shown in FIGS. 5 to 9, the downwardly extending tube is attached to the support structure 1 by means of an articulated coupling allowing a certain degree of relative movement between said tube and said structure.

Figure 5:
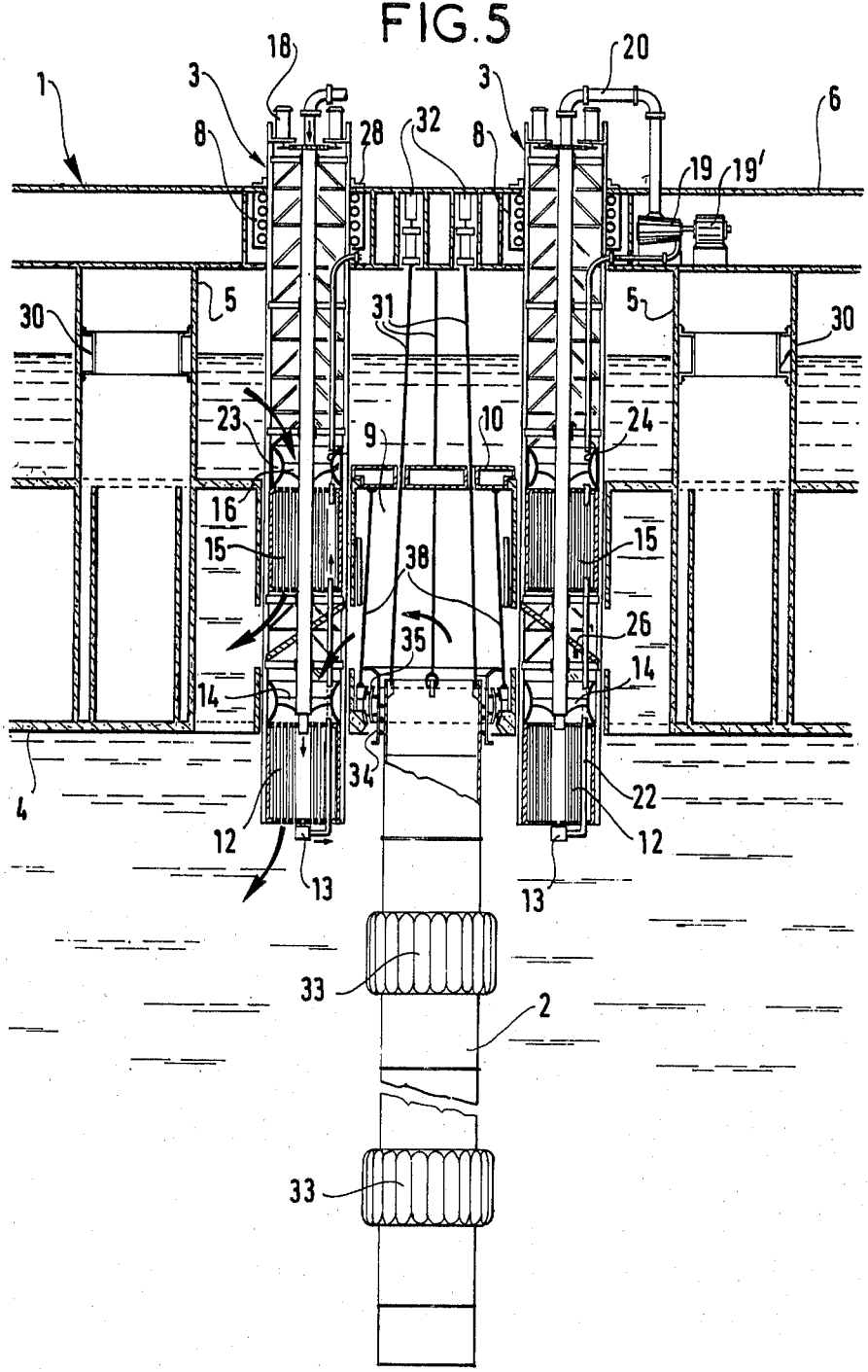
FIG. 5 is a cross-sectionl through the platform showing a first version of the connection between the downwardly extending tube and the support structure.

In accordance with what has previously been said on the subject, and as shown in FIG. 5, the support structure 1 is semi-submersible and comprises a cellular concrete base 4 surmounted by columns 5 supporting a working deck 6 above the water surface, each module 3 passing through said base and said working deck. The downwardly extending tube 2 discharges into a central cell 9 9 communicating with the cells receiving said power modules. According to the present embodiment of the invention, the articulated coupling is at the level of the bottom of the central cell 9 which is closed off at the top by a watertight cover 10.

With a downwardly extending tube 2 of positive apparent weight, the upper end of the tube may be suspended by cables 31 connected to the support structure, passing through the watertight cover 10 and being attached to the working deck, for example. The connection is advantageously provided by damping jacks 32 housed within said working deck and disposed between pairs of pulley blocks to apply a constant tension to the cables so as to compensate for movement of the structure caused by the action of the ocean swell. To complement the suspension cables, the downwardly extending tube 2 may be provided with a series of inflatable flotation chambers 33 which are not inflated to their final size until installed on the tube.

Figure 6:
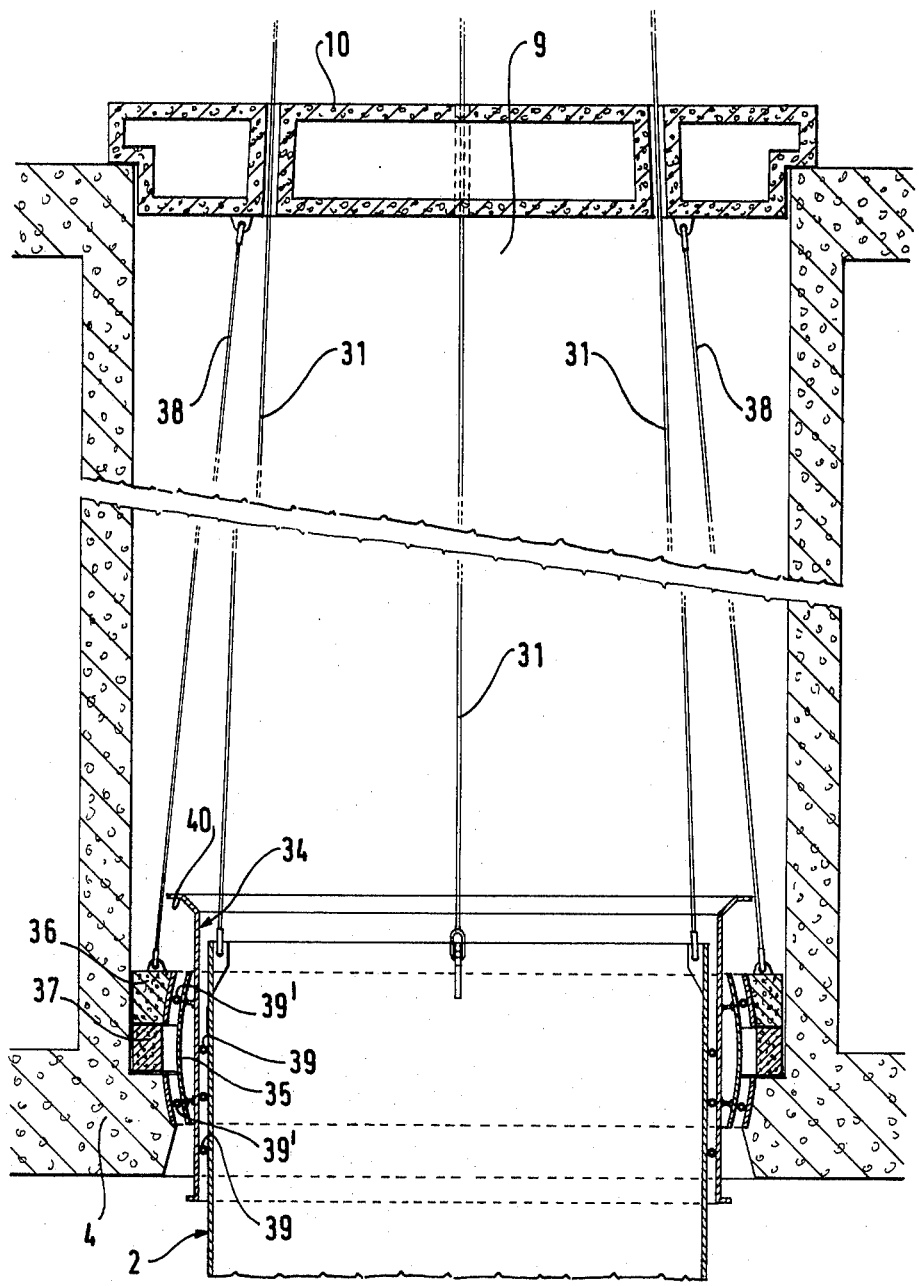
FIG. 6 is a more detailed vertical sectional view of the connection shown in FIG. 5.

For a better understanding of the tube/support structure interface in this first embodiment of the invention, refer to FIG. 6 which is to a considerably larger scale than FIG. 5. The upper end of the tube, suspended from the cables 31, passes through a sleeve 34 carrying an external collar 35 defining, with the apron of the base 4 and a ballasted holding toroid 36, a ball joint. Said toroid rests on a spacer 37 and is suspended from the watertight cover 10 by cables 38. Such a ball joint typically provides free movement in all directions relative to the vertical up to approximately 5°. Inflatable seals 39 are provided on the internal surface of the sleeve to provide a seal between the downwardly extending tube and said sleeve. The ball joint collar 35 may with advantage be fitted with seals 39' of the same type.

Since the inflatable seals are subject to wear, the connection must be designed to be dismantled to permit their replacement. To this end, the upper end of the sleeve 34 terminates in a collar 40 whose external diameter exceeds the smallest internal diameter of the suspended ballasted toroid 36. Replacement of the worn seals may then be carried out as follows:

ballast is removed from the watertight cover 10 so that it rises to the surface, taking with it the ballasted toroid and the sleeve carrying the deflated seals, the latter sliding along the downwardly extending tube which remains suspended from the cables 31, which act as guides for the watertight cover as it rises to the surface;

the cover 10 is raised onto the working deck by winches (not shown) or any equivalent lifting apparatus;

if the hoisting operation does not provide above-water access to the suspended sleeve, ballast is removed from the semi-submersible structure until such access can be obtained;

the inflatable seals are replaced;

the sleeve and ballasted toroid are lowered until the ball joint assembly assumes its initial position;

the seals are reinflated.

Figure 7:
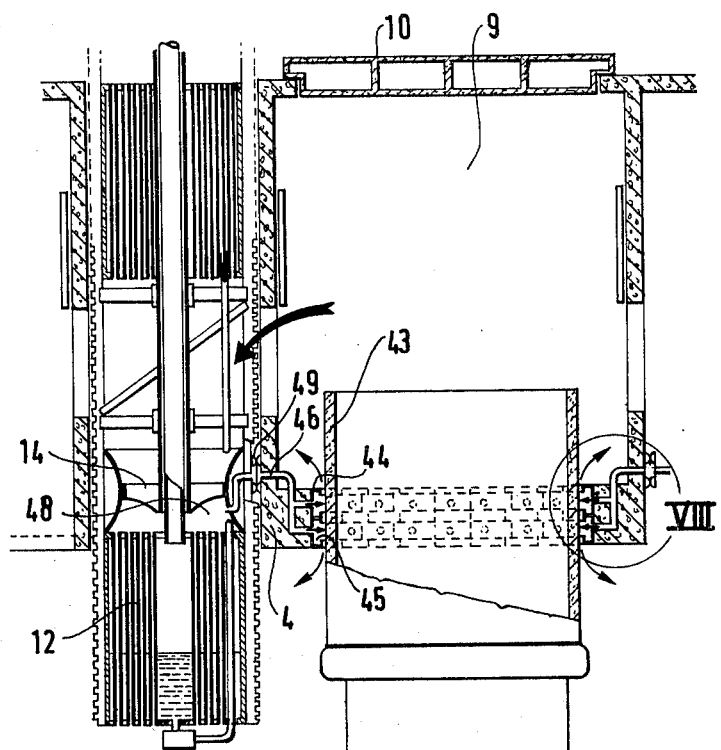
FIG. 7 is a cross-section through an alternative arrangement of this first version of the connection between the downwardly extending tube and the support structure.
Figure 8:
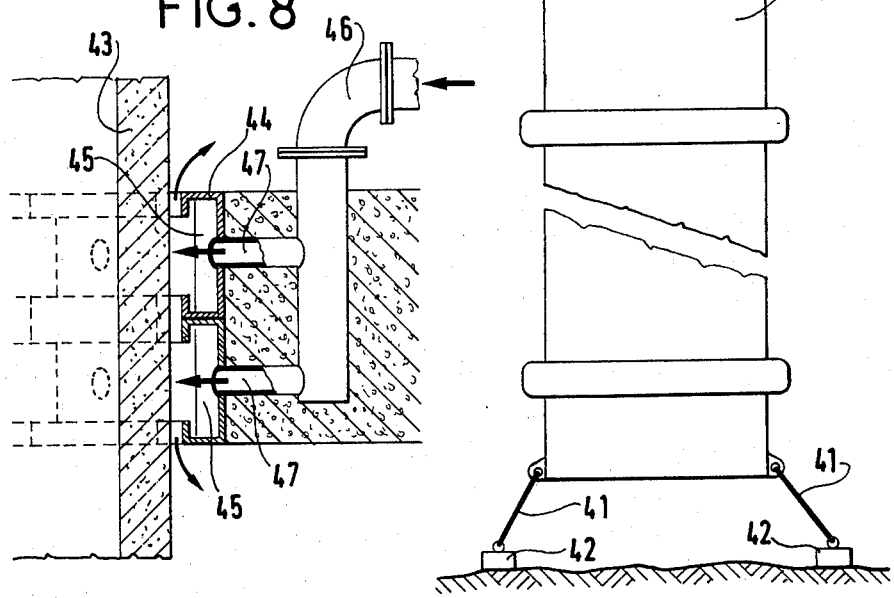
FIG. 8 shows detail VIII from FIG. 7 to a larger scale.

FIGS. 7 and 8 show an alternative version of the first embodiment of connection between the downwardly extending tube and the support structure. In this version the downwardly extending tube slides in an annular sheath attached to the lower portion of the structure, the intermediate space being filled with water under pressure.

This system of connection may be used with a downwardly extending tube supported by the previously described structure. It may also be used with a tube having positive buoyancy and anchored to the sea bed, an arrangement which would be virtually impossible using the previously described ball joint connection. This version will therefore be described with reference to a positive buoyancy tube anchored to the sea bed.

The upper portion of the downwardly extending tube 2, whose lower end is anchored to dead weights 42 by anchor lines 41 comprises a rigid tubular component or section 43 which, like the other component parts of said tube, has positive buoyancy. This rigid tubular component 43 slides freely inside an annular sheath 44. To prevent the component 43 jamming in its sheath and to minimise friction, the intermediate annular space is filled with water under pressure, the water being pressurized by cold water from the central cell 9, after passing through the cold water circulation pump (rotor 14) of at least one power module and discharging peripherally into the annular sheath.

To this end, the internal surface of the sheath 44 is formed with a plurality of cells 45, each of which is fed with water under pressure fed from collectors 46 via conduits 47. In the working position, said collectors 46 face the outlet from the downstream cold water chamber 48 of the modules from which water is being discharged. Each collector is provided with a sliding seal 49 so as not to hinder the upward movement of the module to its raised position.

The dimensions of the annular sheath are computed on the basis of the maximum loads to which the rigid tubular component 43 is subjected due only to the effect of the current acting on the downwardly extending tube 2. The dimensions are such that the contact pressure between the component 43 and the sheath 44 is always less than the pressure of the water in the intermediate space.

By this means, cold water flows from the annular sheath 44 toward the cold water chamber 9, since this is at a lower pressure than the external environment, cold water also flowing beneath the apron of the base 4, so preventing entry of hot water into the cold water circuit.

In the same manner, the ball joint connection previously described may be modified by providing an intermediate space filled with water under pressure.

Figure 9:
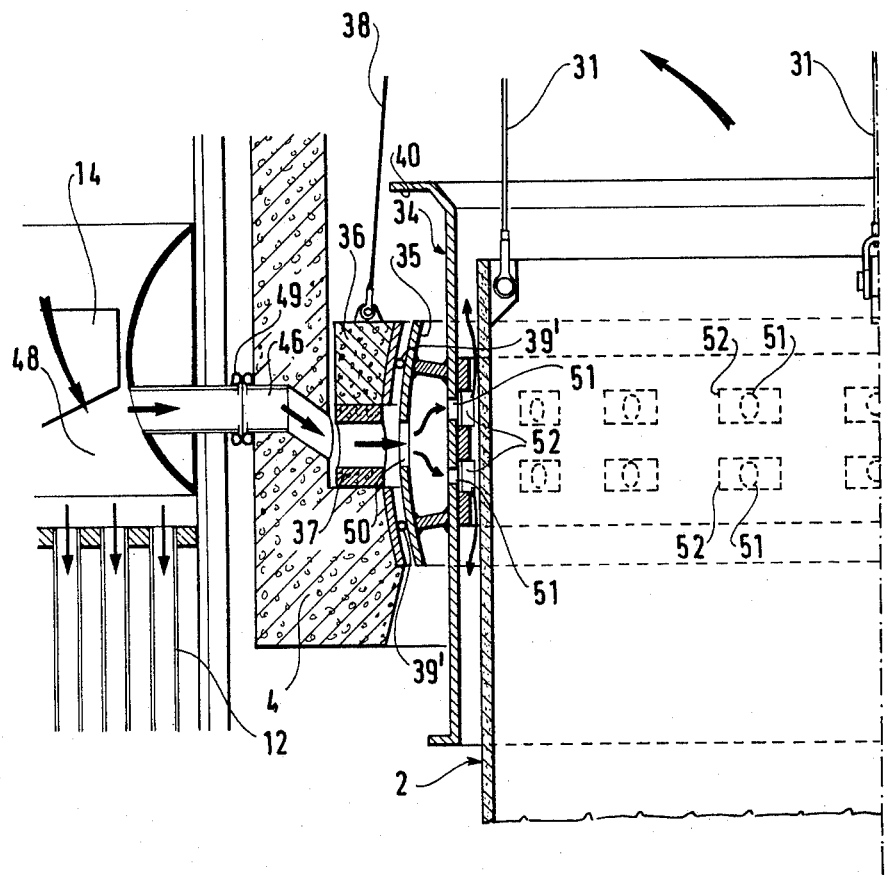
FIG. 9 is a vertical section which shows a modified version of the connection shown in FIG. 5, to a larger scale.

Thus FIG. 9 shows an intermediate annular space between the sleeve 34 and the facing end portion of the downwardly extending tube 2, filled with water under pressure in an analagous manner to that already described. Cold water from the central cell passes through the cold water circulation pump (rotor 14) of at least one module, arrives at the associated collector 46 and discharges peripherally into the collar 35 of the sleeve, via opening 50. It then discharges into the sleeve itself through openings 51 in peripheral cells 52. This version has the advantage that it eliminates the need for the inflatable seals 39 shown in FIG. 2, which are subject to wear and which involve complete shutdown of the installation for replacement. For ease of comprehension, components already indicated in FIGS. 6, 7 and 8 are indicated in FIG. 9 by the same reference numerals.

According to a second version shown in FIGS. 10 to 14, the method of connection of the downwardly extending tube to the support structure permits sufficient relative movement to accommodate movement of said structure, without disturbance to the thermal energy production process, providing for a satisfactory seal between bodies of water at different temperatures and basically being intended to maximise the independence of the movement of the platform from that of the downwardly extending tube, whatever the nature of those movements, while facilitating erection and maintenance.

In this second version, the downwardly extending tube 2 is connected to the support structure 1 by self-contained means decoupling the movement of said platform from that of said tube, whatever the directions of said movements.

Figure 10:
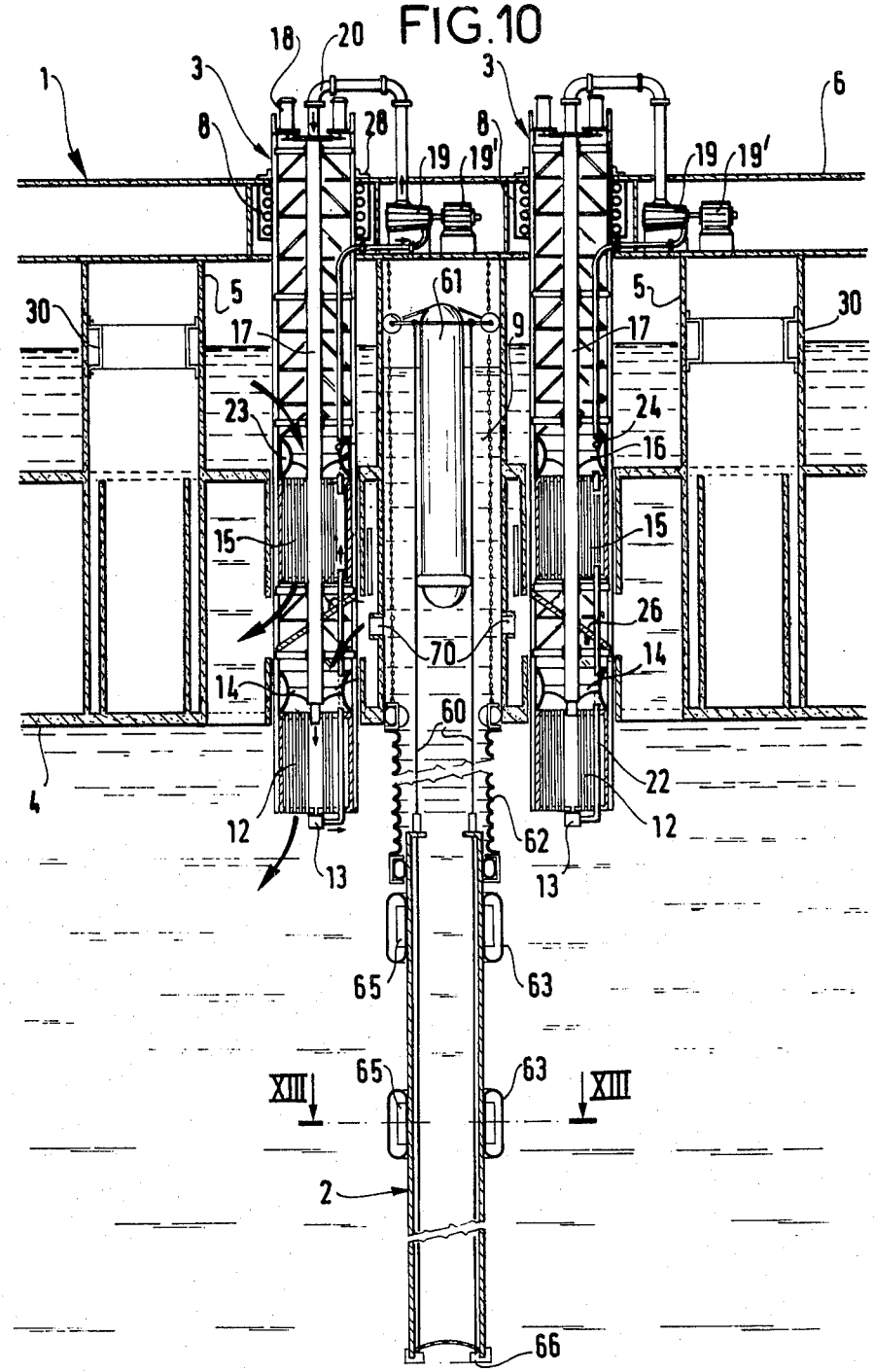
FIG. 10 is a vertical cross-section through the platform showing a second version of the connection between the downwardly extending tube and the support structure.

In accordance with what has previously been said on the subject, and as shown in FIG. 10, the support structure 1 is semi-submersible and comprises a cellular concrete base 4 surmounted by columns 5 supporting a working deck 6 above the water surface, each module 3 passing through said base and said working deck. The downwardly extending tube 2 discharges into a central cell 9 communicating with the cells receiving said power modules. in this second version, the central cell 9 is a cylindrical chamber aligned with the vertical axis of the platform, the lower portion of said chamber passing through the apron of the structure 4 whereas its upper portion (in this instance attached to the working deck 6 for increased rigidity) is in open communication with the atmosphere. The self-contained support means for said downwardly extending tube 2 comprise suspension cables 60 connecting said tube to at least one flotation unit 61 disposed in the cylindrical chamber 9, a seal being provided between said chamber and said tube. The seal preferably comprises a flexible sleeve 62 connecting the lower portion of the cylindrical chamber 9 to the upper portion of the downwardly extending tube 2. The flexible sleeve 62 will be described in more detail hereinafter.

The downwardly extending tube 2 is fabricated from cylindrical components which are of low apparent weight in water (being fabricated from lightweight concrete, for example). Its positive apparent weight is supported, via suspension cables, by the flotation unit 61 which emerges above the water surface in the cylindrical aspiration chamber 9. This arrangement is highly advantageous in that movement of the downwardly extending tube may be virtually eliminated, the water level in the cold water aspiration chamber containing said flotation unit being unaffected by the external ocean swell. Depending on the material from which the downwardly extending tube is fabricated, it may be of advantage to lighten the tube by means of inflatable bladders 63 (FIG. 10) or rigid annular floats 64 (FIG. 11). A preferred embodiment of the bladders 63 is shown in FIG. 10 and in cross-section in FIG. 13. The bladders may be inflated from cylinders 65 of compressed gas contained within the flexible bladders. The cylinders of compressed gas may be opened by remote control, by means of an acoustic device, for example. The number of cylinders and the cylinder contents are determined on the basis of the inflated volume required at the selected depth of immersion.

The downwardly extending tube 2 is therefore constructed of easily handled and stackable cylindrical components. It is supported at the lower end by the cables 60 attached at one end to the flotation unit 61 and at the other end to a support ring 66 which is fitted with a strainer. The dimensions of the flotation unit 61 are determined on the basis of the apparent weight of the tube to be supported. Its diameter is less than that of the cylindrical chamber 9 at all points, and is such as to permit free movement of the flotation unit in the chamber. The flotation unit 61 is provided with means for guiding it in its vertical movement within the cylindrical chamber. These means may comprise, for example, retractable guide rollers 67 which centre the flotation unit irrespective of its vertical position, and external protection members which prevent the suspension cables 60 rubbing against the flotation unit, constituted in this instance by an elastomer buffer 68. The cables are preferably given a slight pretension by cable jacks 69 located on the upper portion of the downwardly extending tube 2, so as to prevent relative movement of the cables and the tube which would otherwise wear the cables. It should be noted that the water level within the cylindrical chamber 9 will generally be slightly lower than the level of the surface of the sea due to the removal of cold water via the conduits 70 leading from the chamber to the associated pumps, providing a further reason for the use of the aforementioned cable jacks.

The flexible connecting sleeve 62 providing a seal between the cylindrical chamber 9 and the downwardly extending tube 2 is preferably longitudinally extensible. FIG. 12 shows an advantageous embodiment of the sleeve 62 in which flexible half-toroids 71 (made from an elastomer or from reinforced rubber) are rivetted to flat steel rings 72. An alternative arrangement might comprise stacked inflatable toroidal bladders bonded to one another. The platform is free to move without imposing loads on the downwardly extending tube, the flexible sleeve 62 acting as a bellows accommodating variations in the distance between the upper portion of the tube and the base of the platform. For a platform rated at 120 MW and with the worst possible sea conditions, the amplitude of this relative movement would be of the order of ±8 m. The ability of the sleeve 62 to accommodate large relative movement of the support structure and downwardly extending tube is illustrated in FIGS. 14A, 14B and 14C. FIG. 14A shows the equilibrium position, in which the sleeve is moderately extended. FIG. 14B shows a trough in the swell in combination with a sideways movement to the right of the support structure. FIG. 14C shows a crest of the swell in combination with a sideways movement of the support structure to the left.

The flexible sleeve 62 must provide a watertight connection between the top of the downwardly extending tube and the base of the platform. It is preferable to use inflatable elements for this purpose. The sleeve 62 therefore terminates at its upper end in a collar 73 around the outside of which is arranged an annular inflatable seal 74. The flexible sleeve 62 terminates at its lower end in a collar 75 around the inside of which is arranged an annular inflatable seal 76. The upper collar 73 is directly or indirectly suspended from the working deck by suspension means 77 which are preferably chains. This collar has on its inside peripheral edge external protection members which prevent the suspension cables for the downwardly extending tube rubbing against the collar. In this instance, these protection members comprise an annular elastomer buffer 78. The collar 75 is retained in position on the downwardly extending tube by a stop 79 attached to said tube.

As with the cylindrical components making up the downwardly extending tube, the sleeve is installed via the cylindrical chamber, which means that the diameter of said chamber constitutes an upper limit to the dimensions of all component parts. The lower collar bears on the associated stop on the downwardly extending tube, whereas the upper collar is supported by the suspension means whose length determines its installed position. The upper and lower seals are then inflated to constitute a watertight assembly.

The flexible sleeve 62 is the component of the system which is most susceptible to damage, even though it is not a mechanical component. It may easily be removed by passing it up between the flotation unit and the wall of the cylindrical chamber, however, so that it may replaced without the use of additional equipment and without requiring any dismantling. This arrangement minimises the time needed to replace this component. Furthermore, variations in sea conditions during the raising or lowering operations do not represent a danger to the downwardly extending tube, so that it is not necessary to take special precautions.

It will be understood that the invention is not limited to the embodiments which have been described by way of non-limiting example only, and that it covers all variations using equivalent means falling within the scope of the accompanying claims.

We claim:

1. A platform for utilization of the thermal energy of the sea, said platform comprising:
    a floating structure carrying a downwardly extending tube for taking up cold water,
    at least two power modules supported on said floating structure,
    each power module comprising an evaporator and a condenser and pumps for circulation of hot and cold water,
    each power module being connected to a turbine-driven generator set,
    the improvement wherein the support structure has open upright cells receiving said power modules, and wherein each module has its component parts arranged in a vertical array so as to constitute a cylindrical assembly extending through the support structure cell, and wherein the support structure is semi-submersible and comprises a cellular concrete base surmounted by columns supporting a working deck, and each module passes through said base and said working deck.

2. A platform according to claim 1, wherein a central cell of said base is connected to the downwardly extending tube taking up cold water for water discharge into a central cell of the cellular base of the structure, and said cell communicates with the cells of said base receiving said modules.

3. A platform according to claim 2, further comprising a moving door to selectively shut off communication between the central cell and the cells receiving said modules.

4. A platform according to claim 2, wherein the downwardly extending tube is attached to the cellular base by means of a flexible coupling allowing a certain degree of relative movement between said tube and said support structure.

5. A platform according to claim 2, wherein said central cell is closed off at the top by means of a watertight cover which is auto-buoyant and submersible.

6. A platform according to claim 1, wherein the downwardly extending tube is attached to the support structure by means of an articulated coupling allowing a certain degree of relative movement between said tube and said structure, and wherein the downwardly extending tube discharges into a central cell of said base communicating with the cells receiving said power modules, and wherein said articulated coupling is at the level of the bottom of the central cell which is closed off at the top by a watertight cover.

7. A platform according to claim 6, wherein the upper end of the downwardly extending tube is of positive apparent weight and is suspended by cables connected to said support structure through a swell compensating system, and passes through a sleeve carrying an external collar defining, with the base of said structure, a ball joint, and wherein inflatable seals are provided between said upper end of said tube and the internal surface facing said sleeve.

8. A platform according to claim 7, wherein the part of said ball joint operatively engaging the collar of the sleeve comprises a ballasted toroid suspended from the watertight cover on cables.

9. A platform according to claim 8, wherein the cables supporting the top of the downwardly extending tube pass through the watertight cover and are connected to the working deck, and wherein the top of the sleeve terminates in a collar whose external diameter is greater than the smallest internal diameter of the suspended ballasted toroid.

10. A platform according to claim 7, further comprising means for filling the space between the sleeve and the facing end of the downwardly extending tube with water under pressure.

11. A platform according to claim 10, wherein said water filling means comprises means for feeding pressurized cold water from the central cell, after passing through the cold water circulation pump of at least one power module peripherally into the collar of the sleeve and then the sleeve itself.

12. A platform according to claim 11, wherein the internal surface of the sleeve has a peripheral cellular region, and each cell is fed with cold water under pressure.

13. A platform according to claim 6, wherein the upper portion of the downwardly extending tube slides in an annular sheath attached to the lower portion of the structure, and the intermediate space is filled with water under pressure.

14. A platform according to claim 13, further comprising means for discharging pressurized cold water from the central cell, after passing through the cold water circulation pump of at least one power module peripherally into the annular sheath.

15. A platform according to claim 14, wherein the internal surface of the annular sheath is formed with a plurality of cells, each of which is fed with cold water under pressure.

16. A platform according to claim 13, wherein the upper end of the downwardly extending tube is suspended from said support structure by a swell compensating system.

17. A platform according to claim 13, wherein the downwardly extending tube is of negative apparent weight and has its lower end attached to the seabed.

18. A platform according to claim 7, wherein the downwardly extending tube comprises inflatable floatation chambers which complement the articulated coupling to said support structure.

19. A platform for utilization of the thermal energy of the sea, said platform comprising:
a floating structure carrying a downwardly extending tube for taking up cold water,
at least two power modules supported on said floating structure,
each power module comprising an evaporator and a condenser and pumps for circulation of hot and cold water,
each power module being connected to a turbine-driven generator set,
the improvement wherein the support structure has open upright cells receiving said power modules, and wherein each module has its component parts arranged in a vertical array so as to constitute a cylindrical assembly extending through the support structure cell, and
wherein said structure further comprises lifting equipment and each module comprises an integrated moving tower so as to constitute a cartridge movable vertically by said lifting equipment carried by the support structure.

20. A platform according to claim 19, wherein the moving tower comprises support means adapted to bear on the support structure, so as to complement said lifting equipment when in service.

21. A platform according to claim 19, wherein an oblique deflector is attached to the moving tower between the lower part of the evaporator and the cold water circulation pump rotor, so that hot water having passed through the evaporator is taken off through the open bottom of a cell adjacent the cellular base of the support structure, and said platform further comprises means for directing cold water from the downwardly extending tube towards the rotor of the associated pump and then to the upper part of the condenser.

22. A platform for utilization of the thermal energy of the sea, said platform comprising:
a floating structure carrying a downwardly extending tube for taking up cold water,
at least two power modules supported on said floating structure,
each power module comprising an evaporator and a condenser and pumps for circulation of hot and cold water,
each power module being connected to a turbine-driven generator set,
the improvement wherein the support structure has open upright cells receiving said power modules, and wherein each module has its component parts arranged in a vertical array so as to constitute a cylindrical assembly extending through the support structure cell, and wherein said hot and cold water circulating pumps in each module have rotors driven by a common and substantially vertical shaft.

23. A platform according to claim 22, wherein the condenser and the evaporator of each module are coaxial with the common rotor drive shaft of the hot and cold water circulation pumps.

24. A platform according to claim 23, wherein said condenser and evaporator have tubes engaged at their ends in circular headplates and are arranged so as to provide a central circular passage for the rotor drive shaft of the pumps and/or the conduit carrying the low-pressure cryogenic fluid.

25. A platform for utilization of the thermal energy of the sea, said platform comprising:
a floating structure carrying a downwardly extending tube for taking up cold water,
at least two power modules supported on said floating structure,
each power module comprising an evaporator and a condenser and pumps for circulation of hot and cold water,
each power module being connected to a turbine-driven generator set,
the improvement wherein the support structure has open upright cells receiving said power modules, and wherein each module has its component parts arranged in a vertical array so as to constitute a cylindrical assembly extending through the support structure cell, and
wherein each module comprises a circuit for the passage of a cryogenic fluid passing through the turbine of the associated turbine-driven generator set, and
wherein said pump includes a pump rotor drive shaft and a portion of the circuit carries the expanded gas towards the condenser and comprises a conduit which is inside and coaxial with the pump rotor drive shaft.

26. A platform according to claim 25, wherein said hot water circulation pump includes a rotor and a portion of the circuit carries the compressed gas towards the turbine of the associated turbine-driven generator set and comprises a separator consisting of an annular space whose outside surface is directed towards its axis and forms a venturi for the hot water circulation pump rotor.

27. A platform for utilization of the thermal energy of the sea, said platform comprising:
a floating structure carrying a downwardly extending tube for taking up cold water,
at least two power modules supported on said floating structure,
each power module comprising an evaporator and a condenser and pumps for circulation of hot and cold water,
each power module being connected to a turbine-driven generator set,
the improvement wherein the support structure has open upright cells receiving said power modules, and wherein each module has its component parts arranged in a vertical array so as to constitute a cylindrical assembly extending through the support structure cell, and
wherein the downwardly extending tube is attached to said support structure by self-contained means decoupling the movement of said platform from that of said tube, whatever the directions of said movements, and
wherein said support structure is semi-submersible and comprises a cellular concrete base surmounted by columns supporting a working deck, each module passing through said base and said working deck, and wherein said tube discharges into a central cell of said base communicating with the cells receiving power modules, and wherein said central cell is a cylindrical chamber aligned with the vertical axis of said platform, the lower portion of said chamber passing through the apron of said structure, the upper portion thereof being in open communication with the atmosphere, said self-contained support means for said downwardly extending tube comprising suspension cables connecting said tube to at least one floatation unit disposed in said cylindrical chamber, and a seal is provided between said chamber and said tube.

28. A platform according to claim 27, wherein said floatation unit is provided with means for guiding it in its vertical movement within said cylindrical chamber.

29. A platform according to claim 27, wherein said floatation unit is provided with external protection members which prevent the suspension cables rubbing against it.

30. A platform according to claim 27, wherein said seal comprises a flexible sleeve connecting the lower portion of said cylindrical chamber to the upper portion of the downwardly extending tube.

31. A platform according to claim 30, wherein said flexible sleeve is longitudinally extensible.

32. A platform according to claim 31, wherein said flexible sleeve comprises a series of flexible half-toroids attached to rigid rings.

33. A platform according to claim 30, wherein inflatable members form the connection between said flexible sleeve and the lower portion of said cylindrical chamber and the connection between said sleeve and the upper portion of the downwardly extending tube also provide a sealing action at each of said connections.

34. A platform according to claim 33, wherein said flexible sleeve terminates at its upper end in a collar around the outside of which is arranged an annular inflatable seal.

35. A platform according to claim 34, wherein said collar is directly suspended from the working deck.

36. A platform according to claim 34, wherein said collar has at its inside peripheral edge external protection members which prevent the suspension cables for the downwardly extending tube rubbing against the collar.

37. A platform according to claim 27, wherein the downwardly extending tube is of positive apparent weight and is fitted with inflatable floatation chambers which complement the tube suspension cables.

38. A platform according to claim 37, wherein each inflatable chamber contains cylinders of compressed gas, which are openable by a remote control acoustic device.

39. A platform according to claim 37, wherein the downwardly extending tube carries cable jacks operatively coupled to the tube suspension cables and said cables are attached to the lower end of the tube to pre-tension said cables.

40. A platform according to claim 27, wherein the external diameters of the component parts of the connection between the downwardly extending tube and said support structure are all less than the internal diameter of said cylindrical chamber.

* * * * *